United States Patent [19]
Gelder et al.

[11] Patent Number: 5,593,602
[45] Date of Patent: Jan. 14, 1997

[54] METAL SUBSTRATE FOR A MAGNETIC DISC AND MANUFACTURE THEREOF

[75] Inventors: Richard Gelder, Preston; John M. Bradshaw, Chorley, both of United Kingdom

[73] Assignee: Pilkington PLC, United Kingdom

[21] Appl. No.: 203,623

[22] Filed: Mar. 1, 1994

[30] Foreign Application Priority Data

Mar. 29, 1993 [GB] United Kingdom .................. 9306542
Jan. 7, 1994 [GB] United Kingdom .................. 9400260

[51] Int. Cl.$^6$ ................................................. C23F 1/00
[52] U.S. Cl. ................................. 216/42; 216/22; 216/49; 216/50; 216/100
[58] Field of Search .............................. 216/22, 42, 100, 216/105, 102, 49, 50

[56] References Cited

U.S. PATENT DOCUMENTS

| | | | |
|---|---|---|---|
| 4,264,410 | 4/1981 | Frantzen | 156/659.1 |
| 4,407,695 | 10/1983 | Deckman et al. | 156/659.1 X |
| 4,642,163 | 2/1987 | Greschner et al. | 156/644 X |
| 4,664,748 | 5/1987 | Ueno et al. | 156/659.1 |
| 4,879,457 | 11/1989 | Ludden | 235/487 |
| 5,059,279 | 10/1991 | Wilson | 156/659.1 X |
| 5,127,330 | 7/1992 | Okazaki et al. | 101/450.1 |
| 5,166,006 | 11/1992 | Lal et al. | 156/664 X |
| 5,220,725 | 6/1993 | Chan et al. | 156/659.1 X |
| 5,242,544 | 9/1993 | Itoh et al. | 156/659.1 |
| 5,275,693 | 1/1994 | Nakama | 156/644 |
| 5,312,514 | 5/1994 | Kumar | 156/659.1 X |
| 5,388,020 | 2/1995 | Nakamura et al. | 428/694 SG |

*Primary Examiner*—Thi Dang
*Attorney, Agent, or Firm*—Burns, Doane, Swecker & Mathis LLP

[57] ABSTRACT

The present invention provides a process for producing a metal substrate for a thin film magnetic data storage disc, the process including the steps of: (a) providing a metal substrate; (b) printing a masking pattern onto at least a portion of the surface of the substrate; and (c) etching the unmasked surface of the substrate thereby to texture the substrate surface. The present invention also provides a metal substrate for a thin film magnetic data storage disc, the substrate having a roughened surface produced by preferential area etching, the roughened surface being composed of a regular pattern of peaks separated by valleys.

9 Claims, 3 Drawing Sheets

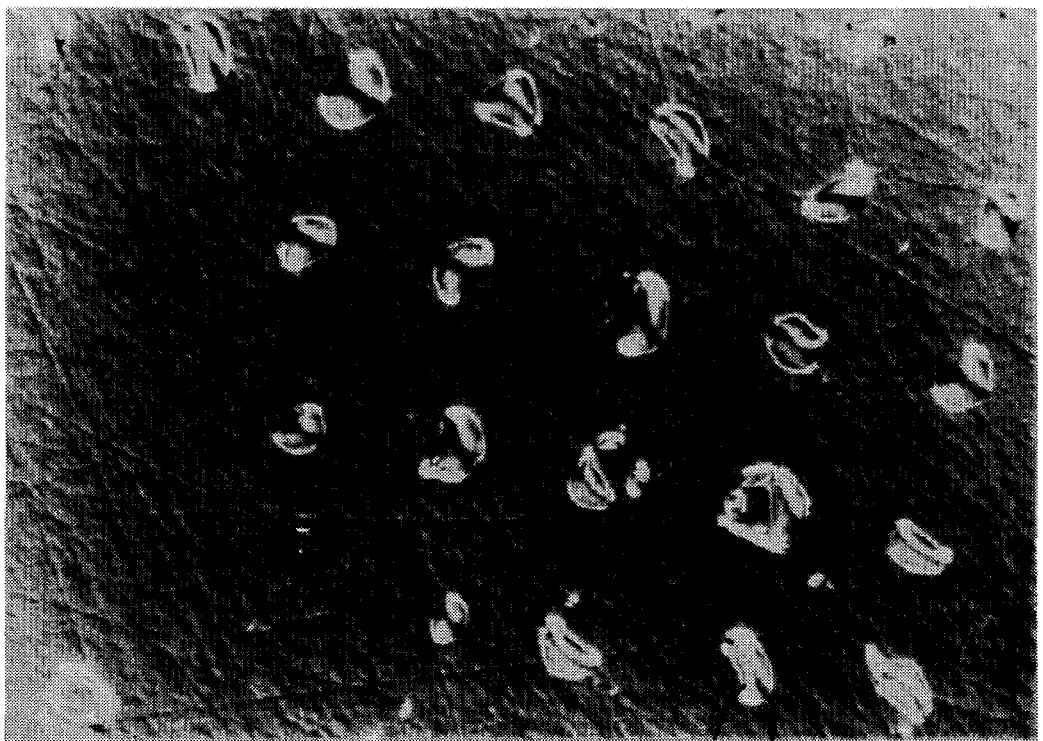
×850  Fig.5  12 2
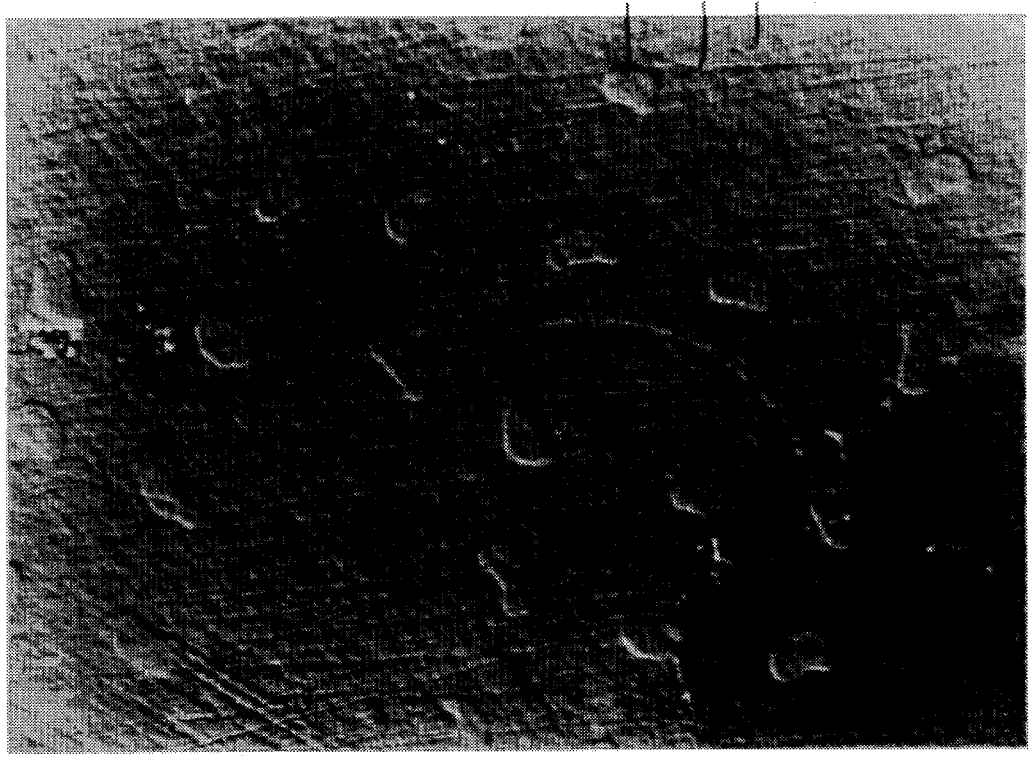
×850  Fig.6

METAL SUBSTRATE FOR A MAGNETIC DISC AND MANUFACTURE THEREOF

BACKGROUND TO THE INVENTION

The present invention relates to a metal substrate for a thin film magnetic storage disc and to a process for producing such a substrate. The metal substrate may comprise a disc composed of metal or at least one metal layer carried on a glass disc, and in this specification the term "metal substrate" is intended to cover both of those constructions.

Thin film magnetic discs for storing data are known in which a magnetic recording medium has been deposited onto a metal substrate in the form of a disc. Known metal substrates are made of aluminium or anodised titanium. In use, the magnetic disc is disposed in a magnetic disc drive unit which utilises a magnetic head for reading and writing information from and onto the disc. Prior to the reading and writing operation, the disc is stationary and the head is in contact with the magnetic recording medium on the disc. In the reading and writing operation, the disc is driven to rotate at a predetermined speed relative to the head which can be moved radially relative to the disc. The head is spaced a very small distance from the magnetic recording medium and is adapted to read information from and write information onto the magnetic recording medium at the desired place on the magnetic recording medium. After the reading and writing operation, the rotation of the disc is terminated and the head is permitted to return to the initial configuration wherein the head contacts the disc. This method of operating a disc is known in the art as a contact-start-stop (CSS) method. It is known that such magnetic disc drive units suffer from the problem of "stiction" or static friction which exists between the head and the magnetic recording medium on initiation or termination of the reading or writing operation. This stiction can cause wear of the head and of the medium and thus can reduce the life time of the magnetic disc drive unit. The tendency for stiction to occur increases with increasing smoothness of the magnetic recording medium. The metal sustrate can have such a smooth surface that the overlying magnetic recording medium which has a correspondingly smooth surface is so smooth that the surface area of the medium actually contacting the static recording head is sufficiently large whereby the stiction problem can be encountered during use of the drive unit. This can cause premature failure of the drive unit and/or the media as described above.

It is known to texture the surface of the metal substrate by mechanically abrading the surface after an initial polishing step. The abrasion is carried out either by an abrasive tape or by loose abrasive material. However, we have found that the use of mechanical abrading of the disc surface has the disadvantage that a fully isotropic micro-textured surface can be difficult to achieve.

SUMMARY OF THE INVENTION

The present invention aims to provide a method of producing a metal substrate for a thin film magnetic data storage disc, the metal substrate having a textured or roughened surface, which has advantages over these known processes.

Accordingly, the present invention provides a process for producing a metal substrate for a thin film magnetic data storage disc, the process including the steps of: (a) providing a metal substrate; (b) printing a masking pattern onto at least a portion of the surface of the substrate; and (c) etching the unmasked surface of the substrate thereby to texture the substrate surface.

The present invention further provides a metal substrate for a thin film magnetic data storage disc, the substrate having a roughened surface produced by preferential area etching, the roughened surface being composed of a regular pattern of peaks separated by valleys.

The metal substrate may comprise a metal disc or at least one metal layer carried on a glass disc.

BRIEF DESCRIPTION OF THE DRAWINGS

Embodiments of the present invention will now be described by way of example only, with reference to the accompanying drawings, in which:

FIG. 5 is a photomicrograph of a surface of a metal disc carrying an array of printed ink dots formed in accordance with an embodiment of the present invention; and FIG. 6 is a photomicrograph of the metal disc of FIG. 5 after removal of the ink dots to provide a textured surface on the metal substrate.

DETAILED DESCRIPTION OF THE PREFERRED EMBODIMENTS

Figure 1A:
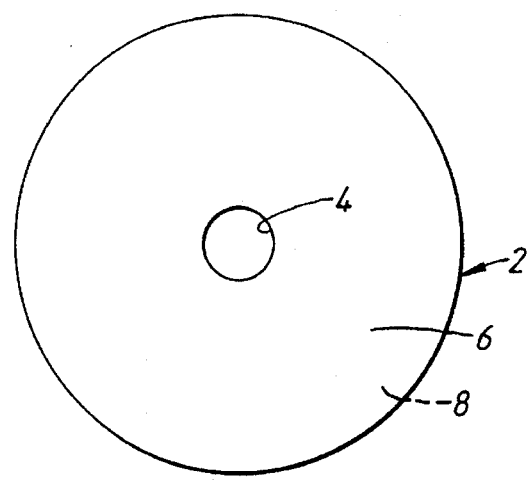
FIG. 1a is a plan view of a metal disc to form a metal substrate for a thin film magnetic data storage disc in accordance with an embodiment of the present invention.

Referring to FIG. 1a, there is shown a metal disc 2 having a central circular hole 4 to form a metal substrate for a thin film magnetic data storage disc in accordance with the present invention. The metal disc 2 is typically an aluminium disc coated with a hard layer of nickel/phosphorous alloy. The nickel/phosphorous alloy provides a hard surface which can be polished to an acceptable surface roughness prior to texturing.

Figure 1B:
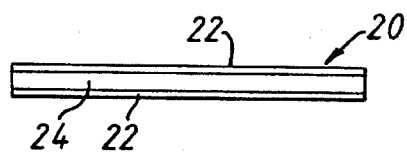
FIG. 1b is side view of a glass disc carrying opposed metal layers to form a metal substrate for a thin film magnetic data storage disc in accordance with a further embodiment of the present invention.

FIG. 1b illustrates a modification of the arrangement of FIG. 1a wherein instead of the metal substrate comprising a metal disc, the metal substrate comprises at least one metal layer, for example of nickel/phosphorous alloy, carried on a glass disc, for example of float glass. Glass discs are known form, for example, U.S. Pat. No. 4,833,001 and U.S. Pat. No. 5,087,481. The metal layer may be deposited onto the glass surface by sputtering or electroless deposition. FIG. 1b shows a substrate for a magnetic data storage disc comprising opposed metal layers 22 carried on a glass disc 24.

Initially, the metal surface is polished, for example by a mechanical or chemical polishing process, in order to remove surface damage from the opposed disc surfaces 6,8 which are ultimately to carry the magnetic recording medium. The polishing is controlled to provide a selected degree of maximum initial surface roughness of the metal disc.

The initial average surface of the metal disc can be determined from measurement of the surface of the metal, for example, by means of an optical or stylus profilometer such as that made by Wyko Inc. of Arizona, U.S.A. and sold under model No. TOPO-3D or the Talystep profilometer made and sold by Rank Taylor Hobson of Leicester, England. Such profilometers can measure the profile of the surface of the substrate, the surface of which is composed of a series of peaks and valleys. The surface finish can be defined by a "mean line" which is a line which bisects the peak/valley profile such that over any given cross sectional length the area of the peaks above that line is equal to the area of the valleys below that line, with both areas being a minimum. The surface roughness average (which has also been referred to in the art as the arithmetic average or the center line average), is the arithmetic average of the distance of the roughness profile from the mean line over a given assessment length of the mean line or for a given number of assessment points along the mean line. The roughness average is statistically a stable parameter and is good for representing the roughness of random-type surfaces. The roughness average is also easy to implement into known profilometer instrumentation.

The polished metal disc is then cleaned by washing with an aqueous detergent and deionised water and then the metal disc 2 is dried in air or nitrogen gas.

In accordance with the present invention, the metal substrate is textured by a printing and etching process.

Figure 2:
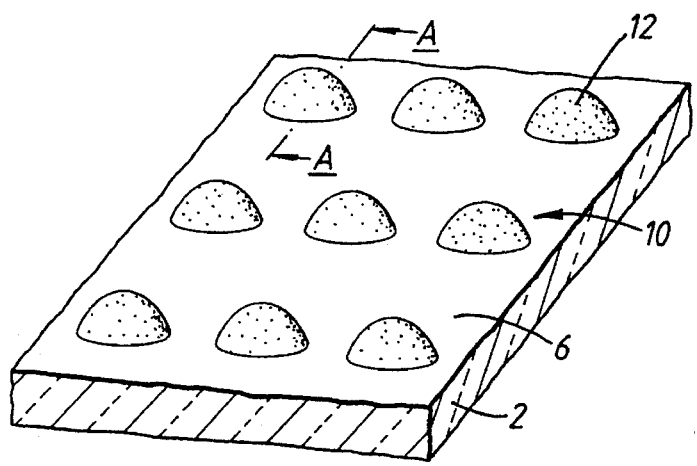
FIG. 2 is a schematic perspective view of the surface of the metal substrate of FIG. 1a which has been printed with an ink dot pattern in accordance with an embodiment of the present invention.
Figure 3:
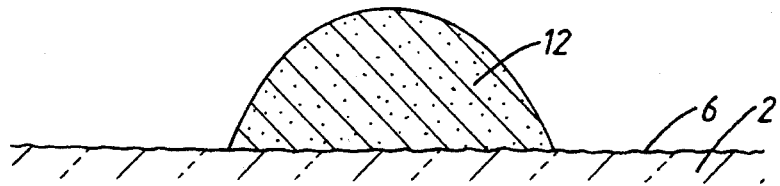
FIG. 3 is an enlarged cross-section on line A—A through an ink dot and the substrate shown in FIG. 2.

Referring to FIG. 2, the cleaned metal disc 2 is then printed in a manner described hereinbelow with a pattern 10 of ink onto each surface 6,8 (simultaneously or successively) of the disc 2. In this specification the term "printing" is intended to refer to a printing process in which ink is printed onto the metal surface; the printing process may be a gravure printing-process, for example an offset gravure process such as pad printing; a lithographic printing process such as offset lithography, or a letter press printing process. The term "printing" does not encompass photolithographic techniques. In the illustrated embodiment, the pattern 10 is composed of ink dots 12. In FIG. 2, as in FIGS. 3 to 4, the vertical extent of the printed dots 12, and the resultant surface of the metal disc 2, are greatly exaggerated with respect of the horizontal extent (typically by a factor of 100 to 1000 to 1) for the sake of clarity of illustration. However, the pattern 10 may alternatively be composed of lines or other shapes, provided that after etching the desired surface roughening of the metal disc 2 is obtained. As will be seen with reference to FIG. 2, in the preferred embodiments the ink dot pattern 10 is printed in a regular array which may either be an orthogonal array, which is preferably a square array, or a non-orthoganol array, which may be a triangular array. Alternatively, the array may be circular with the dots being formed either in concentric circles or in radial lines. A triangular array can provide a high density array of ink dots. In plan view the dots may be circular, elliptical, rectangular with rounded corners or any other shape. Preferably, the dots are approximately circular in plan. Preferably, the pitch between adjacent ink dots ranges from 5 to 100 microns, with a typical value being from 15 to 30 microns. The pitch between the adjacent ink dots 12 is the distance between the centres of the adjacent dots 12. When the ink dots 12 are approximately circular in plan, depending on the limits of the printing process which is employed to print the dots 12, they preferably have a base diameter up to 60 um with a typical diameter being from 5 to 15 um. It is believed that the diameter of the ink dots 12 may be reduced, with careful control of the printing processes, down to about 2 um. The thickness of the ink dots 12 in the vertical direction is not particularly critical. The thickness is controlled so that the ink dot is of sufficient thickness so as to act as a mask during a subsequent etching process which is described hereinafter. Typically, the ink dots 12 are around a few microns thick, for example up to about 10 microns thick, more preferably from 2.5 to 10 microns thick.

The resultant printed structure is shown in FIG. 5.

The printing ink which is employed is of a type which is suitable for application to metal. The printing ink should be resistant to the selected etchant in the etching step but be cleanly removable from the metal surface subsequent to the etching step. The ink is preferably particulate-free but the ink may incorporate non-particulate colouring agents. However, the ink may for some applications contain a fine particulate pigment. The ink possesses a surface tension which enables extremely fine dots 12 to be printed on the surface of the metal substrate. Preferably the ink is a resinous ink. A suitable particulate-free ink is a resinous non-hardened ink of a group of inks sold by AM Ramp & Co. GmbH of Eppstein, Germany under the designation RUCO 10-KK, a particular ink being RUCO 10-KK-3976 NT. However other similar resinous inks may be employed. Such a resinous ink may be removed from the metal surface after the etching step by a solvent. Suitable solvents are butanone (ethyl methyl ketone), N-methyl-2-pyrrolidone, cyclohexanone, acetone, methanol/methylene chloride, or 1,1,2 trichloroethylene.

Alternatively, the ink may be bonded effectively to the metal by including a hardener in the ink mix. Certain inks are known in the art as being suitable for bonding to metal. Such inks are two-part inks, one part of the ink being the non-hardened resinous ink and the other part being the hardener. In the case of RUCO 10-KK ink identified above, the hardener 37172 (also sold by AM Ramp & Co. GmbH) is preferred, preferably in an amount about 20% by weight of the ink. In certain applications, the degree of bonding between the metal and the ink can be too strong and so a smaller amount or even no hardener is added to the ink. Alternatively, a single component ink may be employed. If the bonding is not strong enough then baking or curing of the ink, for example by heating using a fan oven, microwave oven or any other means of treating the samples with electromagnetic radiation suitable for the curing/baking of printing inks, may improve the bonding. For example, overnight drying in a heated oven may be employed if heating temperatures are as low as 65° C. are used, although raising the temperature significantly reduces the time needed. For example, at 80° C. a typical heating period is around 1 hour.

Figure 4A:
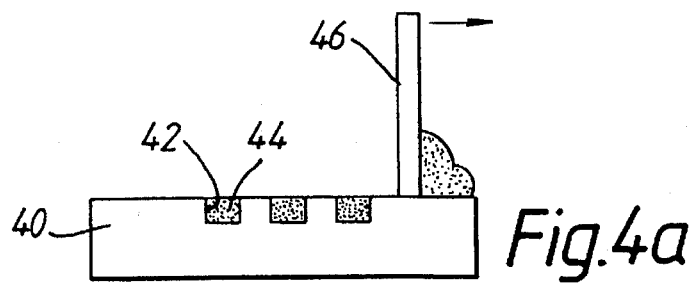
FIG. 4a to 4e illustrate schematically a sequence of steps in a pad printing process for printing the ink dot pattern of FIGS. 2 and 3.
Figure 4B:
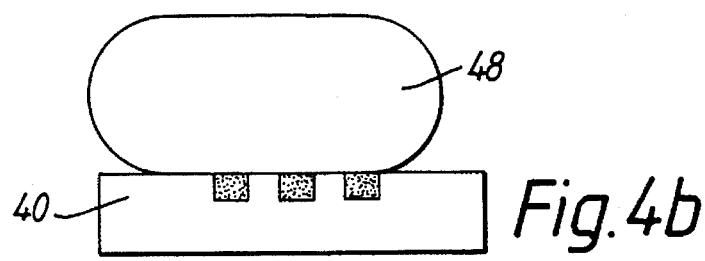
Figure 4C:
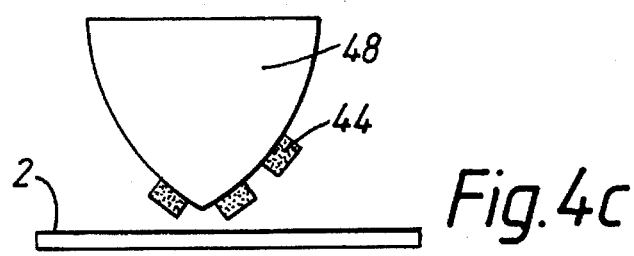
Figure 4D:
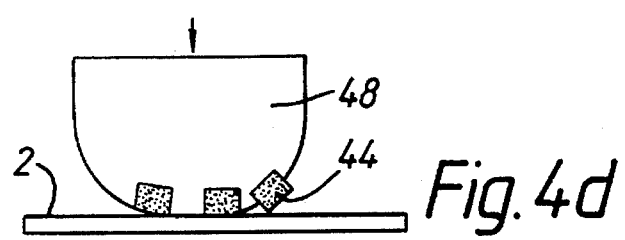
Figure 4E:
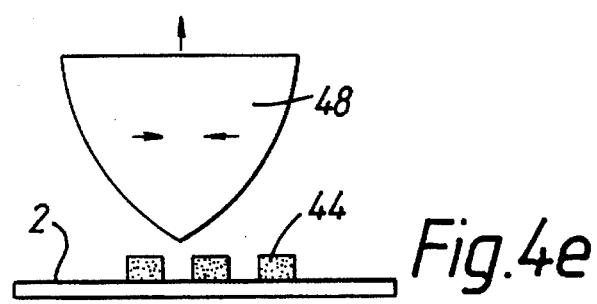

A variety of printing processes may be employed, such as offset gravure, letterpress or lithography. However, a preferred method of printing the matrix of ink dots 12 onto the metal substrate 2 uses an offset gravure method of printing known in the art as "pad" printing. This is broadly described as follows. As shown in FIG. 4a, the process uses a printing plate 40 which has etched into the surface thereof an array of pits 42 which matches the pattern which is required to be printed. The pits 42 are filled with ink 44 using, for example, a doctor blade 46, so as to form an ink dot pattern corresponding to the array of etched pits 42. Then the ink dots 44 are allowed to dry by a controlled amount so as to render the ink tacky. As shown in FIG. 4b, a pad 48 is pressed against the pattern of ink dots 44 on the printing plate 40. The ink dots 44 adhere preferentially to the pad 48 so that, when the pad 48 is removed from the plate 40, the ink dots 44 remain adhered to the pad 48 and are removed from the plate 40. As is shown in FIGS. 4c and 4d, the pad 48 is then pushed down onto the substrate 2 and the ink dots 44 are transferred onto the substrate 2. The pad 48 is then removed, depositing dots 44 in the desired array on the substrate 2.

More particularly, the printing plate 40 is preferably formed as follows. A "screen" is formed which can be either an acetate sheet with the images of the dots burned on it using a laser or a glass photomask (such as those available in commerce from the company Compugraphics of Glen Rothes, Scotland) which is formed with the desired pattern upon it. The screen is placed in contact with a photoresist layer coated on a metal plate, which may be of the type sold under the trade name "Nyloplate" sold by the firm Teca-Print UK of Sheffield, England. The photoresist is then exposed to a source of ultraviolet radiation. When large dot sizes are required, an acetate screen and a multipoint UV source are preferably used and when smaller dot sizes are required, the dots are preferably formed using a glass photomask and a single point UV source, which can produce better defined dots.

The photoresist layer is then developed by a known process so as to leave an array of pits in the resist layer. The photoresist layer can constitute the upper surface of printing plate 40 shown in FIG. 4a, or alternatively, the pits 42 can be etched completely through into the metal plate carrying the photoresist layer. In this embodiment, the photoresist layer is removed completely after etching of the pits 42 into the metal layer. This leaves a much more durable printing plate.

The printing plate 40 is then mounted on a pad printing machine, which is known in the art, and is flooded with ink thereby filling the array of pits 42. The excess ink is then scraped off automatically, back into a reservoir, by the doctor blade 46.

The ink viscosity tends to vary with local operating additions and is adjusted as necessary by dilution with an appropriate amount of a suitable thinner such as the thinner sold by AM Ramp & Co. GmbH under the trade name Ruco 100 VR 1271. Typically, the viscosity of the ink may vary from 0.5 to 8 seconds as measured using a Teca-Print viscospatula. The pad 48 comprises a specially shaped silicone rubber pad, such as that available in commerce from Teca-Print UK mentioned above or the company F. Schmid of Cormoret, Switzerland. The pad has the property of being relatively deformable and so is able to contact all the ink dots 44 in the holes of the printing plate 40. In the printing machine, such as that available in commerce from Teca-Print UK referred to hereinabove, the pad 48 is carefully brought into contact with the array of ink dots 44. The printing machine is adjusted so as to apply the pad over the required surface of the printing plate and at the right pressure enabling it to pick up the whole array of ink dots. The pad 48 is then brought by the machine into contact with the metal disc substrate and the dots are deposited onto the metal disc substrate in the defined array.

The present inventors have found that the pad printing process illustrated in FIGS. 4a to 4e does not always put sufficiently circular dots of ink down onto the metal substrate. For example, the dots of ink may have an eliptical or otherwise non-circular configuration. The present inventors have found that more circular dot shapes can be obtained if the printing ink contains only fine particulate material or more preferably no particulate material. The present inventors have further found that after the printing step, if the temperature of the printed ink dots is raised above 80° C., more particularly during the drying stage after the printing step, then the ink dots become more rounded. It is believed that during the heating step, the ink becomes sufficiently fluid so that the surface tension forces are strong enough to cause the ink dot to consolidate and become significantly more circular in plan. This rounding effect has been seen using the ink Ruco 10 KK -3976 referred to above. This ink contains no particulate pigment and is used without a hardener. It is believed that without a pigment, it is possible for the ink to become more mobile at a higher temperature and consequently readily spherodises so as to become rounder on heating.

The rounding of the printing dots provides a technical advantage in the final printed metal substrate. This is because when the dots are more circular in plan in the printed structure then the dots will etch to give a more uniform series of textured peaks in the metal substrate. This can significantly assist in the consistency of the flying characteristics of the magnetic disc head.

Following the printing operation, the metal substrate 2 is then subjected to an etching process in which the surface regions of the metal substrate 2 which are not directly covered by the masking array 10 of printed ink dots 12 are etched to a controlled depth in order to roughen or texture the surface of the metal substrate 2 to the desired roughness without substantially changing the overall flatness of the disc.

In the preferred embodiment, after the printing step the metal substrate is etched electrochemically in an aqeous solution of ammonia. In the electrochemical etching step, the metal disc constitutes the anode in an electrochemical cell and the cathode is preferably constituted by a stainless steel rod. Preferably, the electrical current density is from 0.005 to 0.02 amps per square centimetre and the applied voltage is 15 volts. The ammonia concentration may vary from 5 to 50% by volume and the etching temperature may vary from 18.5° to 50° C. The etching time may vary from 60 to 300 seconds. Optionally, air is bubbled through the ammonia solution in order to assist etching. Generally, the etching solution is stirred steadily during the etching process. The ink dots are not removed during the etching process.

The present invention is further illustrated with reference to the following non-limiting examples.

EXAMPLES 1 TO 11

The results of the etching of a variety of samples in ammonia are shown in Table 1. In Examples 2, 3, 5 and 6 the etch step (i.e. the peak height) was measured using a Talystep profilometer and the etch step ranged from around 9 to around 180 namometers. The preferred conditions for the etching step are to use a 10% ammonia solution at 40° C. for 300 seconds with the metal disc being the anode in an electrochemical cell.

FIG. 6 shows the metal substrate 2 after the etching step wherein the unmasked surface of the metal substrate 2 has been etched as described above. The etch depth can be controlled depending on the selected etch temperature, etch time, etch current and etchant concentration. Generally, the concentration of the etchant, the etch temperature, the etch time and the etch current are controlled so as to be readily compatible with a production environment. It will be noted from FIG. 6 that the unmasked surface of the metal substrate 2 is etched to provide an array 14 of metal peaks 16 on the metal surface, the distribution of the array 14 corresponding to that of the original printed ink dots 12. The peaks 16 are separated by flat bottom valleys 18. The etch process is calibrated by performing a series of prior etch calibration tests so that for any set of process conditions a known etch period can produce the desired degree of etching of the metal surface. At the end of the prior-calibrated etch period the etching process is stopped by removal of the substrate from the etchant solution and washing with water. The etch process is controlled so as to provide in the resultant substrate average peak heights of from about 9 to about 180 nm. As with the array 10 of printed ink dots 12, the metal peaks 16 are typically around 5 to 30 microns in base diameter and have a repeat pitch which is typically from 10 to 100 microns, more preferably from 20 to 60 microns. The surface roughness of the etched metal substrate 2 can be measured using the optical profilometer referred to hereinabove.

We have found that by using the masked etching process, the metal peaks 16 on the metal substrate surface are relatively narrow and thus have a good profile for avoiding the stiction phenomenon referred to hereinabove. The smooth physical dimensions of the peaks 16 on the metal substrate 2 give good mechanical strength to the metal substrate 2 by means of a simple masking and etching technique. The simple masking and etching technique can provide a regular array of very fine surface peaks which can provide the desired toughening or texturing required to enable a thin film magnetic data storage disc to be employed without encountering undue stiction problems.

After the etching step, the ink dot 10 array is removed with a solvent in the case of resinous inks or with an alkaline detergent in the case of acid etch resistant inks. The disc is rinsed with deionised water and then dried and the resultant metal substrate surface is illustrated in FIG. 6.

In accordance with the present invention, either the whole area of the substrate or only selected portions of the area may be textured as aforesaid. Alternatively, the whole disc may be textured but with different areas textured in different ways. Thus the invention may employ limited area texturing for the manufacture of substrates suitable for so-called "contact recording" thin film magnetic data storage discs having a superfine polished surface over the majority of the disc surface. For the manufacture of such discs, the present invention can be employed to texture an annulus, typically 8 mm wide, surrounding the centre hole of the disc. Such textured annulus, in the resultant data storage disc, can be employed as a "parking zone" for the read/write head.

The parking or landing zone can be made by the printing and etching process, with or without masking of the data storage area of the disc, by a gradation in the dot size (diameter) from the outer rim of the annulus to a constant dot diameter towards the centre hole of the disc. This technique provides a gentle ramp to a constant height plateau up which the read/write head can "fly", "land" and "park". The smallest dots of ink can give lower peak heights. The dots may be in rectangular arrays, triangular arrays, concentric ring arrays or continuous concentric rings. The surface roughening of the textured surface thus can be varied to define a plurality of functional zones of the substrate, the zones including a landing zone and a read/write zone, each zone having the desired surface roughening, with optionally there being a graded ramp of roughening between adjacent zones.

The invention may use simple landing zones, by using a disc surface which is untextured apart from a band which acts as a "parking" zone. Such landing zone textures are uniform in height. The texturing is controlled so that the head can fly across the boundary between the landing zone and the remainder of the disc without "crashing" i.e. contacting the disc surface and causing damage thereto.

Another form of landing zone known as a "down" zone may be produced which is an annular textured area where the peaks of the texture are on the same level as the other areas over which the head flies. These other areas may be adjacent and may be either polished or have a significantly shallower texture than the original "down" zone. This substrate can be produced by protecting all over the adjacent areas with a complete covering mask of, for example, printing ink and then printing the texture pattern on to the "down" zone area. During etching, the texture develops only where the metal is exposed. Subsequent cleaning produces a "down" zone as required with adjacent flat polished areas. This arrangement allows the magnetic head to move laterally across the the disc whilst encountering significantly less upset to its flying characteristics than with the previously described landing zone.

In order to produce a two texture substrate, first the whole disc may be covered with the shallow texture by printing overall with the required array and performing a shallow texturing etch. The ink is then cleaned off. Next, the area required to have the shallow texture on the final disc is completely covered with ink to protect the textured surface during subsequent processing. Then the "down" zone is reprinted with the ink dot array required for that area and etched with the stronger conditions necessary to produce the higher texture of the "down" zone. This superimposes the deeper texture of the "down" zone on the shallower texture already present, which is etched out. Alternatively, each area can be protected whilst the other area is printed and etched to be textured to the required degree.

The present invention has enabled the production of a metal substrate for a thin film magnetic data storage disc which results in the magnetic disc having the required low friction coefficient to enable it to pass the known CSS tests for thin film magnetic data storage discs. The process of the invention, employing an etching and masking technique, is very simple but nevertheless gives good stiction performance which improves the lifetime of the magnetic disc. The good profile of the metal substrate results from the formation of a narrow peak profile. The peak pitch and height can be controlled relatively easily using the masking and etching process, which employs simple and relatively inexpensive printing technology. The printing technique has the advantage of providing good repeatability of surface texturing both from one disc to another and between different areas of any given disc.

TABLE 1

| Example | Ammonia Conc. % | Temp. deg. C. | Time sec. | Etch step - nm |
|---------|-----------------|---------------|-----------|----------------|
| 1 | 20 | 54 | 300 | |
| 2 | 20 | 50 | 60 | 128 |
| 3 | 10 | 41 | 300 | 180 |
| 4 | 10 | 43 | 120 | |
| 5 | 10 | 42 | 60 | 9 |
| 6 | 10 | 42 | 300 | 120 |
| 7 | 7.5 | 39.5 | 180 | |
| 8 | 5 | 42 | 180 | |
| 9 | 5 | 41.5 | 300 | |
| 10 | 5 | 40.5 | 300 | |
| 11 | 10 | 38 | 300 | |

What is claimed is:

1. A process for preparing a metal substrate surface of a thin film magnetic data storage disc, the process comprising the steps of:
   (a) providing a disc having a metal substrate surface;
   (b) printing onto at least a portion of the substrate surface a masking pattern comprising spaced printed dots, the printed dots each having a diameter of about 5 to 30 microns; and
   (c) etching the unmasked substrate surface to texture the unmasked substrate surface.

2. A process according to claim 1 wherein the printing step (b) is carried out by pad printing.

3. A process according to claim 1 wherein the masking pattern is formed from a resinous ink.

4. A process according to claim 1, wherein the masking pattern is formed from a resinous ink and further comprising the step of heating the printed masking pattern so as to render the printed dots circular in plan.

5. A process according to claim 1, wherein the printed dots are 5 to 15 microns in diameter and have an average pitch between centers of adjacent dots of about 5 to 100 microns.

6. A process according to any claim 1 wherein the textured surface of the substrate is roughened and composed of a regular array of peaks separated by valleys.

7. A process according to claim 6 wherein the peaks have an average height of from about 9 to about 180 nm.

8. A process according to claim 6 wherein the average peak width is from 5 to 30 microns.

9. A process according to claim 1, wherein the disc is selected from the group comprising of a metal disc and a glass disc having at least one metal layer.

* * * * *